Aug. 6, 1940.   J. V. STEVENS   2,210,782
APPARATUS FOR TREATING OIL EMULSIONS
Original Filed Aug. 10, 1935   3 Sheets-Sheet 1
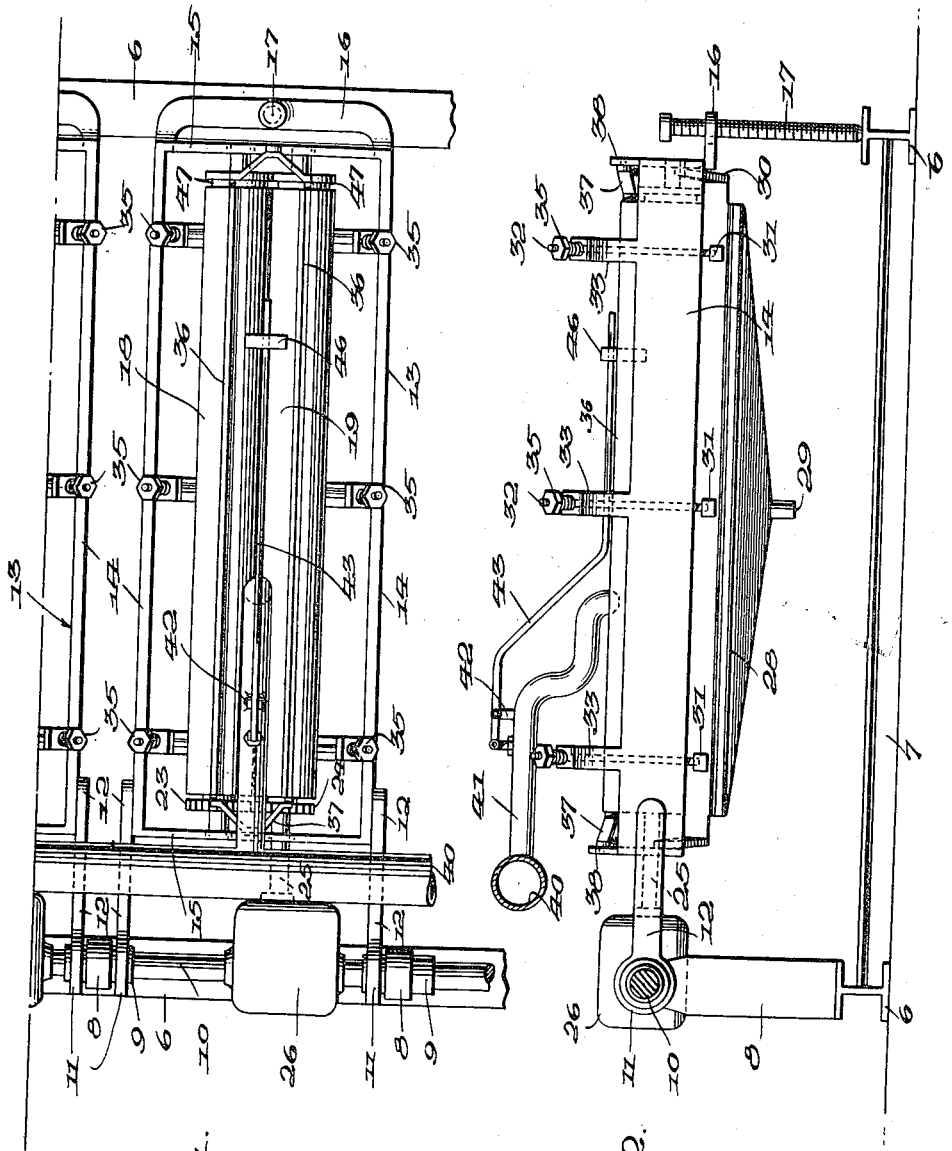
Inventor
JESSE V. STEVENS
By Eugene E. Stevens
ATTORNEY

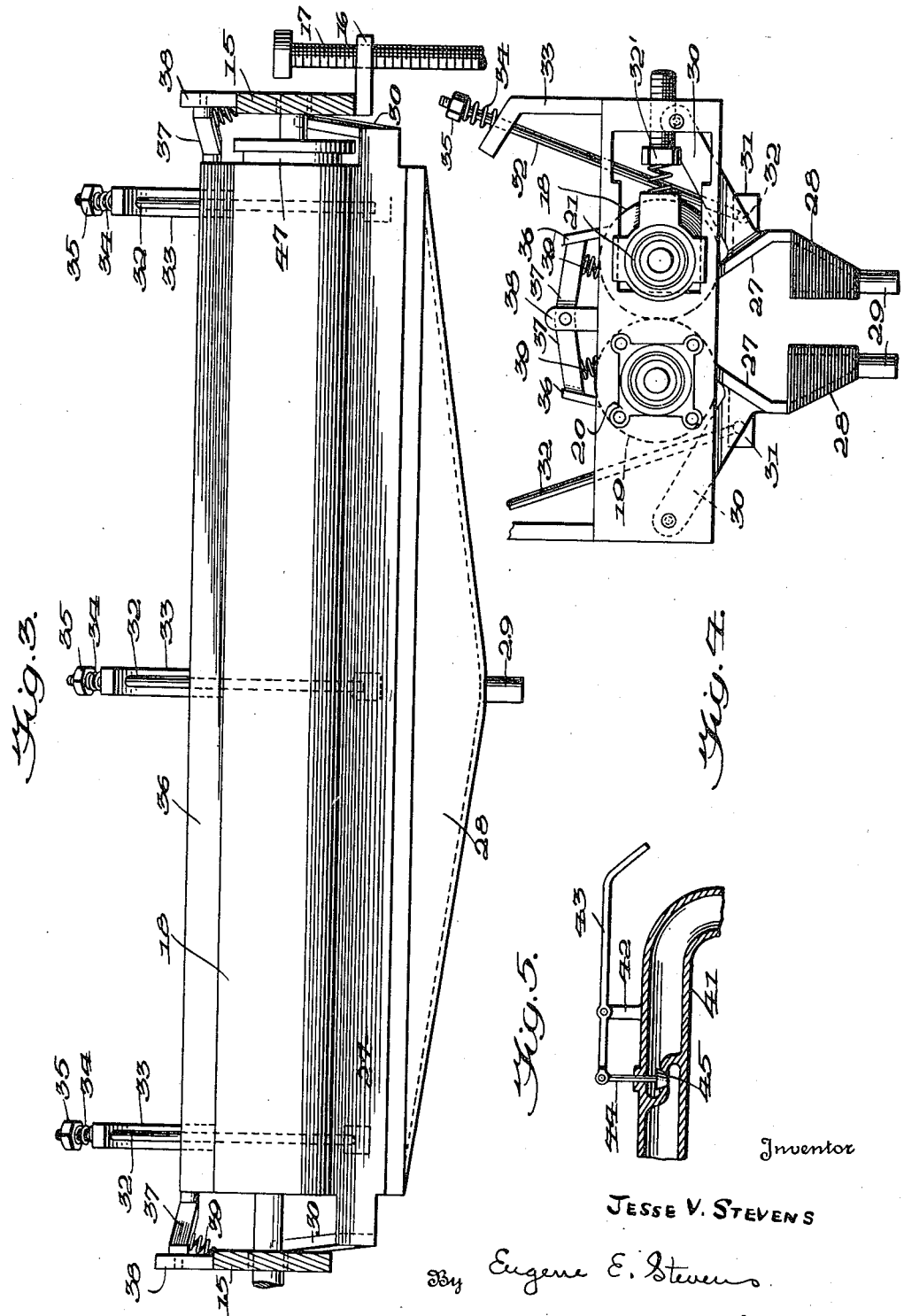

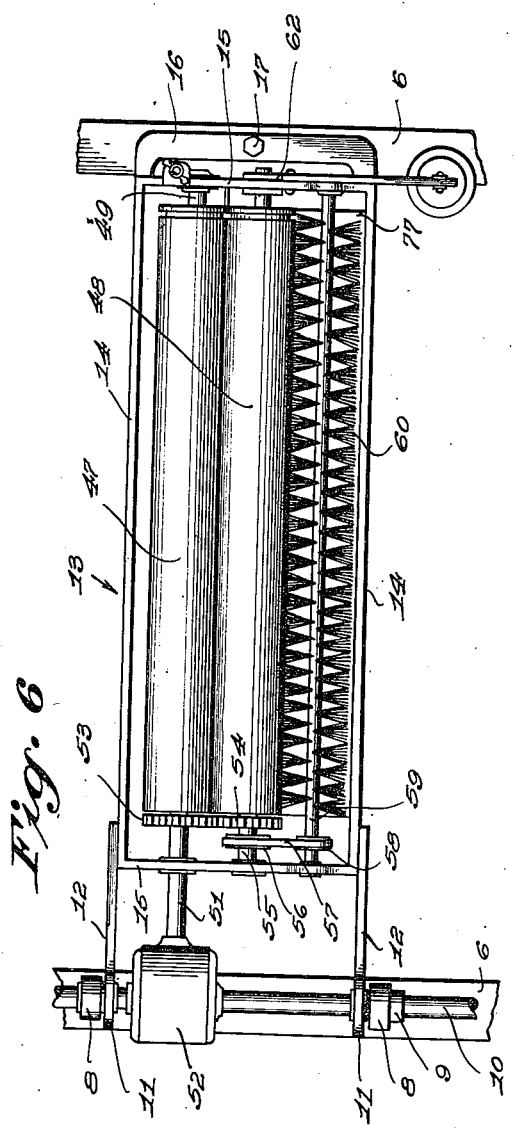

Patented Aug. 6, 1940

2,210,782

UNITED STATES PATENT OFFICE 2,210,782

APPARATUS FOR TREATING OIL EMULSIONS

Jesse V. Stevens, Sapulpa, Okla.

Original application August 10, 1935, Serial No. 35,678. Divided and this application July 21, 1937, Serial No. 154,899

8 Claims. (Cl. 252—349)

My invention relates to a novel apparatus for breaking down and separating out the components of emulsions, mixtures and the like and while susceptible of other applications, finds a field of especial utility in the treatment of oil emulsions such as B. S. (basic sediment) to separate out the water and recover the oil. This case is a division of my application Serial Number 35,678, now Patent No. 2,174,849, dated Oct. 3, 1939, filed August 10, 1935, for Method of separating out components of emulsion.

The problem of breaking down petroleum and water emulsions such as B. S. and emulsions of a more flocculent character has long been a source of difficulty to those working in the petroleum industry. Heretofore, it has been proposed to subject a petroleum emulsion to chemical treatment or heat treatment, or electrical treatment, or physical treatment, either singly or in various combinations for breaking up the oil film-encased water globules. Such practice requires expensive apparatus and the processes require considerable time for consummation, especially since it is necessary as an adjunct to the treatment that the treated emulsion be allowed to stand in a settling tank for the purpose of giving the oil an opportunity to rise to the surface so that it can be drawn off leaving the water at the bottom. Furthermore, in point of efficiency the heretofore existing practices referred to leave much to be desired.

Having in mind the practices and incident problems above referred to, my invention has for its primary object to provide an apparatus for breaking down emulsions and the like which is much more efficient than prior practices and apparatus, less expensive, eliminates necessity for chemical or electrical treatment for the emulsion or the like, and which process in that it eliminates the necessity for a settling tank and effects initial separation of the oil and water may be much more quickly carried out than heretofore existing practices.

A further object of the invention is to provide means for extracting sand and other solid matter from an oil emulsion or the like.

The invention also resides in certain novel features of construction, combination and arrangement of parts of the apparatus, all as hereinafter described and pointed out with particularity in the claims.

In accordance with the patent practice I have illustrated herein what now appears to be a preferred example of the invention. However, it will be understood that the same is susceptible of other mechanical expression within the spirit and scope of the subject matter of the claims.

In the drawings:

Figure 1 is a top plan view of an apparatus as constructed in accordance with the invention;

Figure 2 is a side elevation thereof;

Figure 3 is an enlarged elevation of a roll and scraper mount;

Figure 4 is an end view of the roll and scraper assembly; and

Figure 5 is a sectional detail illustration of a feed control valve employed.

Figure 6 is a top plan view of an alternative embodiment of the apparatus.

Figure 7 is an end view of the apparatus assembly as shown in Figure 6.

Figure 8 is a detail perspective view illustrating elements of the tension adjusting mechanism.

The process which is the subject of my invention consists in the mechanical removal of a constituent of the emulsion (oil for instance) by subjecting the emulsion to the action of a moving surface for which such constituent has a preferential affinity—or in other words, to which such constituent will adhere and in the same operation carrying off to another place the other constituents of the emulsion (water for instance). Assuming the first mentioned constituent to be oil and the second constituent water, globules of which latter are enveloped or encased in a covering of the oil, the movement of a surface for which oil has an affinity will by adhesion catch the oil and then the cohesion of the adjacent globules or portions of oil with on another, or perhaps more properly the surface tension of the oil results in the oil envelopes or casings being pulled from the globules of water thus freeing them so that they may be drawn or carried off to a place different from that to which the moving surface carries the oil.

In carrying out the process it has been found desirable for practical commercial purposes to employ in connection with the moving surface for which the oil has an affinity, another surface adjacent thereto and forming an acute angle therewith so that the action of the moving surface tends to cause a pinching of the conglomeration of oil-encased water globules. This pinching action serves to facilitate the breaking up of the water-carrying oil globules; and furthermore the arrangement of such surfaces makes, as it were, a trough-like structure which results in the water being coalesced therein; and said surfaces may be arranged so as to provide a fall in the direction of one end thereof so that the released water may be carried off and deposited into a container or tank at the lower end of such surfaces while the oil, as previously indicated, will be carried by the moving surface and removed therefrom and deposited in a different container.

For commercial purposes it has been found desirable to use the apparatus disclosed in the accompanying drawings to which detailed reference will now be had.

A preferred form of apparatus comprises a base frame or support consisting of spaced parallel I-beams 6 braced at appropriate intervals by transverse struts 7, one of the beams 6 carrying at spaced intervals a plurality of upright standards 8 providing bearing sleeves 9 for a drive shaft 10 driven from a power source, not shown.

The sleeves 9 extend oppositely from their mounting standards to provide bearings for eyes 11 on the ends of parallel arms 12, adjacent pairs of which are rigidly attached at their opposite ends to the sides of a substantially rectangular cradle frame 13, a number of such frames being disposed in parallel spaced relation along the base to constitute a battery of treating units.

Each frame 13 consists of parallel side bars 14 and end bars 15. At its outer end the frame is provided with lug means 16 having threaded travel connection with a jack screw 17 bearing on the subjacent beam 6, whereby the frame may be tilted through a vertical arc on the pivot formed by the eyes 11 on the bearing sleeves 9.

Extending longitudinally in the cradle frame is a pair of parallel, oppositely rotatable contacting rolls 18 and 19 having their pintles respectively journalled in bearing blocks mounted in the end walls 15. One of these blocks, 20, for the roll 19 is shown in Figure 4, the bearing block 21 for the roll 18 being slidable in the end bar for tension adjustment by the usual tension nut and spring means generally indicated as at 32'. The rolls may be of any desired material but I find it preferable to utilize hard rubber for one roll and chrome steel for the other.

At the inner end of the frame the rolls are geared together for opposite rotation by meshed gears 23 and 24, the pintle of roll 19 extending as a shaft 25 to a gear housing 26 rotatable on shaft 10 and containing the conventional gearing connection for imparting drive from the shaft 10 to the roll shaft 25 for driving the rolls.

Beneath each roll there is provided a scraper and trough assembly comprising a scraper blade 27 extending the full length of each roll and carrying a collecting trough 28 inclined downwardly from each end to the center and having thereat a discharge spout 29. The troughs are so located with respect to the scrapers that they lie directly beneath each scraper. At each end of the frame the scraper plates are swung by means of links 30 rigidly connected at one end to the scraper plate and at the other end having pivotal connection with and adjacent one end of the frame end bar 15. At longitudinally spaced intervals the rear face of each scraper blade or plate 27 is provided with laterally extending lugs 31, each of which has a pivotal connection with the lower end of an eye bolt 32 which has its upper threaded end passed through an appropriately angled portion of an upright 33 extending from the adjacent frame side bar 14. The end of the eye bolt is surrounded by an expansion spring 34 bearing between the angled portion of the upright 33 and against an adjusting nut 35 threaded over the end of the bolt. By this arrangement the scrapers are maintained in contact with the under faces of the roll and under a tension which is adjustable by means of the nuts 35.

In conjunction with the bottom scrapers 27 I provide a pair of top scrapers 36 which likewise extend the entire length of the rolls and which are supported by end links 37 rigidly connected at one end to the scrapers 36 and at the other end having a pivotal connection with a standard 38 mounted on the adjacent frame end bar 15. Springs 39 are provided between the links and the frame end bar to secure a tension upon the scraper blade.

Above the inner or feed end of the frame extends a feed pipe 40 arranged in spaced relation above the frame and substantially parallel with the supporting base beams 6. By means of a sliding sleeve joint the feed pipe 40 connects with a lateral feed branch pipe 41 that extends longitudinally of the roll immediately above the center of the trough provided by the converging faces of the contacting rolls. The pipe 41 is provided with a standard 42 which provides a fulcrum for a feed control lever 43, the inner end of which is pivotally connected with the stem 44 of a feed control valve 45 located in the feed pipe 41, as shown in Figure 5. Beyond its fulcrum the lever 43 is angled downwardly for a short distance and is then turned to extend substantially parallel with the roll so that it lies within or slightly above the trough formed between the two rolls. At its outer end the lever 43 carries a float 46 so shaped that it extends downwardly into the trough between the rolls.

At their outer end, beyond the respective scraper blades, the rolls 18 and 19 are circumferentially grooved to provide registering channels 47 which, as best shown in Figure 1, provide a space between the rolls through which drainage may be effected. It will be understood that in setting the apparatus the outer or free end of the cradle frame is slightly depressed so that the rolls are disposed at an incline downwardly from their inner to their outer ends. By manipulation of the jack screw 17 this angle of inclination may be set to any desired degree.

In the operation of the apparatus the material to be treated, such as the emulsion previously referred to, is fed through the pipe 40 and the branch pipe 41 to discharge over the upper end of the inclined trough provided between the contacting rolls. As these rolls are in close contact and rotate in opposite directions the oil will adhere to the roll surfaces, squeezing out the water, and the oil will pass through the contacting rolls as a thin film while the water collecting in the trough above the contacting faces travels by gravity downwardly along the trough to discharge through the registering channels 47 from which point it may be led off as desired. The oil is drawn through the rolls as a thin film while the water is separated out and decanted off above the roll. The thin film of oil on the roll surfaces is scraped therefrom by means of the scraper blades previously described and deposited in the collecting trough from which the oil is led off through the spout 29 to be collected by any desired means. The top scrapers prevent undue splashing of the emulsion and cooperate with the bottom scrapers in removing the oil film from the contacting roll surfaces.

It is to be understood that the teeth of the gears 23—24 will be sufficiently long to assure meshing engagement in the different adjusted positions of the rolls 18 and 19. Also the frame 13 will provide suitable guards or upper scrapers to prevent the emulsion that is deposited in the trough or bight between the rolls from slopping over into the water tank below.

As will be evident, the apparatus is very simple. It has been found in practice that an apparatus unit involving rolls five feet long and approximately six inches in diameter, driven at approximately 700 R. P. M. with the rolls providing a 30 degree fall in the direction of one end, will have a capacity of a hundred barrels per day. By proper regulation of the flow of emulsion to the rolls in proportion to the capacity of same, substantially complete recovery of all oil can be had. In respect to this the point, of course, is that the feed of emulsion must be so regulated that the rolls will be able to take up all of the oil and transmit same to the scrapers before any oil has run down with the water to the outlet groove 47 in one of the rolls 18, 19 and this is accomplished by the automatic float controlled feed valve.

Of course, the above described unit is but a single example of my invention and the size, R. P. M., and so on set forth in the description thereof is understood to be illustrative only. In practice units having larger or smaller capacities may be used.

The embodiment of the apparatus as shown in Figures 6, 7 and 8 is substantially the same in all major respects of assembly as the form shown in the preceding views, utilizing the same base arrangement comprising the spaced parallel I-beams 6 wth the spaced uprights 8 providing the bearing sleeves 9 for the drive shaft 10, the sleeves 9 extending oppositely from their mounting standard to provide bearings for eyes 11 on the ends of parallel arms 12, adjacent pairs of which are rigidly attached at their opposite ends to the sides of a substantially rectangular cradle frame 13 consisting of parallel side bars 14 and end bars 15. At its outer end the frame is provided with lug means 16 having threaded travel connection with the jack screw 17 bearing on the subjacent beam 6 whereby the frame may be tilted to a vertical arc on the pivot formed by the eyes 11 on the bearing sleeves 9. The structure thus described is identical with the structure illustrated in the preceding views and like reference characters have been used to designate like parts.

Extending longitudinally in the cradle frame 13 is a pair of parallel, oppositely rotatable contacting rolls 47 and 48, the roll 47 preferably being of chrome steel and the roll 48 preferably being of rubber or having a rubber surface. At the outer end of the frame the roll 47 has its pintle 49 journaled in a bearing 50 mounted in the adjacent frame end 16 and at its opposite end the roll pintle is extended as a shaft 51 to a gear housing 52 rotatable on the driving shaft 10 and containing conventional gearing connection for imparting drive from the shaft 10 to the roll shaft 51 for operating the rolls.

At the inner end of the frame the rolls are geared together for opposite rotation by meshed gears 53 and 54 and also at the inner end of the frame the pintle 55 of the roll 48 has a journaled bearing in the adjacent frame end 15 and also carries thereon a fixed pulley 56 which has trained thereover a driving belt 57 engaged over a pulley 58 fixed to the shaft 59 of a rotary brush 60 which parallels the roll 48 slightly above and to one side thereof so that its bristles have a bearing contact against the entire longitudinal surface extent of the roll. The brush shaft 59 is journaled in bearings carried by the frame ends 15 and due to the geared connections between the rolls and the driving connection of the flexible belt 57 as the rolls are rotated the brush 60 will be correspondingly driven to rotate in the same direction as the roll 48 against which it bears. It should here be noted that in order to provide the necessary elevation for the brush roll 60 the frame ends 15 are provided with uprights 61 which provide bearings for the ends of the brush shaft 59, as best shown in Figure 7.

The roll 48 is capable of tension adjustment in the direction of the companion roll 47 by means of a bearing block 62 slidably mounted in the frame end 15 and carrying bearings for the roll pintle 55. Tension is adjusted and maintained by means of a bell crank lever 63 fulcrumed as at 64 to a portion of the frame end, one arm of the lever extending laterally and outwardly from the frame and having pivotally suspended therefrom weight means 64 which may be increased or decreased in a conventional manner of such weights. Beyond the fulcrum 64 the lever is provided with a lateral enlargement 65 which receives therethrough in threaded engagement a bolt 66 adapted to bear against a lug 67 carried by the slidable bearing block 62, the bolt being adjustable in its bearing contact against the block lug 67. The weight means 64 normally tends to depress the lever 63 and rock the same on its fulcrum to move the adjusting bolt 66 against the sliding bearing block and force the block with the roll 48 against the companion roll 47.

As in the case of the apparatus illustrated in the preceding views, the companion rolls 47 and 48 rotate oppositely in close surface bearing contact to provide a trough having downwardly moving converging walls, it being understood that the emulsion to be treated is fed into the trough between the rolls at a point above the rolls, the emulsion feed and control mechanism being eliminated from the assembly as shown in Figures 6 and 7 for clearness of detail.

On the side of the roll 47 the outer end 15 of the frame is provided with a depending lug 68 providing a support for an arm 69 pivotally mounted as at 70 to the lug 68 at one end and carrying at its opposite end a scraper blade 71 adapted to bear against the periphery of the roll at its bottom or lowermost point. The scraper 71 is maintained under tension against the peripheral surface of the roll 47 through the agency of a link 72 pivotally connected at its lower end to the arm 69 and having its upper end passed through a flange 73 on the frame end, the upper extremity of the link being formed as a threaded rod receiving thereover a wing nut 74 which functions to bear against an expansion spring 75 coiled about the shank of the link between the wing nut and the flange 73 so that the spring urges the link upwardly to maintain the arm 69 and the scraper blade 71 in contact with the surface of the rolls.

Immediately beneath the blade 71 the arm 69 is further provided with an oil collecting trough 76, the blade 71 and the trough 76 extending over the entire longitudinal extent of the roll.

Immediately beneath the rotary brush 60 there is provided a second collecting trough 77 suitably mounted on the frame 13 and so positioned as to catch and retain any material discharged from the periphery of the roll 48 by action of the rotary brush 60, which brush moves clockwise with respect to Figure 7 as does also the rubber roll 48.

The brush 60 is preferably formed with wire bristles in some degree of pressure contact against the surface of the roll 48. In the operation of the apparatus, as shown in Figures 6 and 7, when the rolls are operated to separate the emulsion in the manner previously described herein the small foreign particles such as sand and grit carried in the emulsion will be drawn between the rolls and will be forced into the surface of the rubber roll 48 so that they will be carried around by the roll gradually emerging to its periphery under the expanding action of the rubber so as they reach the rapidly rotating brush roll 60 the small foreign particles are brushed rearwardly off into the trough 77. The oil film collecting on the steel roll 47 will be carried around on the periphery of the roll and will be removed by the scraper blade 71 into the collecting trough 76. Water remaining in the trough between the rolls will be decanted off at the outer end of the rollers or may be decanted by passage to peripheral grooves formed in the ends of the roll as in the manner of the grooves 47 shown in the apparatus illustrated in Fig. 1.

By manipulation of the jack screw 17 the frame 13 is adjusted so that the rolls 47 and 48 will be inclined downwardly toward their outer ends, insuring a proper fall for travel of the water remaining in the trough between the rolls so that it may be decanted off at the lower end.

What I claim is:

1. Means for separating an oil and water emulsion, comprising in combination a pair of inclined parallel rollers in surface contact with surfaces having a preferential affinity for oil providing a trough, means for oppositely rotating said rolls, means for feeding emulsion to the trough between the rolls at the high end thereof, means for decanting water at the low end thereof, and means responsive to the level of liquid in the trough for controlling the feed of emulsion thereto.

2. Means for separating an oil and water emulsion, comprising in combination a pair of inclined parallel rollers in surface contact providing surfaces having a preferential affinity for oil and defining a trough, means for oppositely rotating said rolls, means for supplying emulsion to the trough and including a valve, a float in the trough responsive to the liquid level therein, an operative connection between said float and valve to control the supply of emulsion by the level of liquid in the trough, and means for decanting water from the low end of the trough.

3. Apparatus for separating an oil and water emulsion, comprising a pair of parallel rollers in surface contact, one having a rubber surface and the other having a steel surface, said rollers being oppositely rotatable to provide a trough having downwardly moving converging walls, means for feeding emulsion to the trough, separate means cooperative with each roller for removing emulsion ingredients carried on the roller surface, and means for decanting separated water from the trough.

4. Apparatus for separating an oil and water emulsion, comprising a pair of parallel rollers in surface contact, one having a surface of material possessing inherent resiliency, and the other having a non-resilient surface, both said surfaces being preferentially wetted by oil, said rollers being oppositely rotatable to provide a trough having downwardly moving converging walls, means for feeding emulsion to the trough, separate means cooperative with each roller for removing emulsion ingredients carried thereon, and means for decanting water from the trough.

5. Apparatus for separating a petroleum emulsion, comprising a pair of rollers arranged in surface contact whereby to provide a trough therebetween for receiving the emulsion, means for rotating one of said rollers, each of said rollers having surfaces preferentially wettable by oil, said rollers being elevated at one end whereby to cause the emulsion to gravitate toward the opposite end, and means in the surface of one of said rollers at said opposite end providing an outlet for emulsion ingredients not withdrawn by the roller surfaces.

6. Apparatus for separating an oil and water emulsion, comprising a pair of parallel rollers in surface contact, one having a surface of material possessing inherent resiliency, and the other having a non-resilient surface, both said surfaces being preferentially wetted by oil, said rollers being oppositely rotatable to provide a trough having downwardly moving converging walls, a scraper blade cooperable with the non-resilient roller for removing oil from its surface, and a rotary brush engaging the surface of the resilient surface roll for removing emulsion ingredients collected thereon.

7. In an apparatus for separating oil and water emulsions, a pair of parallel rollers in surface contact, one having a resilient surface and the other having a non-resilient surface, both said surfaces being preferentially wettable by oil, means for oppositely rotating said rollers to draw oil therebetween as a film, means beneath said rollers in contact with the non-resilient surfaced roller for removing oil from its surface, and rotary brush means above said rollers in contact with the surface of said resilient surfaced roll for brushing off foreign particles carried by the emulsion being treated.

8. Apparatus for separating an oil and water emulsion, comprising a pair of parallel rollers in surface contact, one having a rubber surface and the other having a steel surface, both said surfaces being preferentially wettable by oil, said rollers being oppositely rotatable to provide a trough having downwardly moving converging walls, means for feeding emulsion to the trough, a scraper blade cooperative with the steel surfaced roller for removing oil therefrom, and a rotary brush cooperative with said rubber surfaced roller for brushing off particles of foreign matter imbedded thereon by the operation of the rollers in separating the emulsion being treated.

JESSE V. STEVENS.